(12) United States Patent
Männer

(10) Patent No.: US 9,004,907 B2
(45) Date of Patent: Apr. 14, 2015

(54) INJECTION MOLDING MACHINE HAVING A TRANSPORT DEVICE DISPOSED ON A BASEPLATE

(75) Inventor: Hans-Peter Männer, Freiburg (DE)

(73) Assignee: Otto Maenner Innovation GmbH, Bahlingen (DE)

( * ) Notice: Subject to any disclaimer, the term of this patent is extended or adjusted under 35 U.S.C. 154(b) by 47 days.

(21) Appl. No.: 13/879,550

(22) PCT Filed: Oct. 17, 2011

(86) PCT No.: PCT/EP2011/005203
§ 371 (c)(1),
(2), (4) Date: Apr. 15, 2013

(87) PCT Pub. No.: WO2012/048902
PCT Pub. Date: Apr. 19, 2012

(65) Prior Publication Data
US 2013/0202728 A1 Aug. 8, 2013

(30) Foreign Application Priority Data

Oct. 15, 2010 (DE) .......... 10 2010 048 657
Oct. 15, 2010 (DE) .......... 10 2010 048 658

(51) Int. Cl.
 *B29C 45/06* (2006.01)
 *B29C 45/72* (2006.01)
 *B29C 45/03* (2006.01)
 (Continued)

(52) U.S. Cl.
 CPC .......... *B29C 45/72* (2013.01); *B29C 45/03* (2013.01); *B29C 45/04* (2013.01); *B29C 45/1761* (2013.01); *B29C 33/06* (2013.01); *B29C 45/0416* (2013.01); *B29C 45/0433* (2013.01); *B29C 2045/0094* (2013.01); *B29C 2045/0475* (2013.01); *B29C 2045/1765* (2013.01); *B29C 2045/7393* (2013.01); *B29C 2945/7604* (2013.01); *B29C 2945/76341* (2013.01);
 (Continued)

(58) Field of Classification Search
 USPC ................... 425/574, 575, 576, 556
 See application file for complete search history.

(56) References Cited

U.S. PATENT DOCUMENTS 2,892,214 A 6/1959 McCarthy
3,006,032 A 10/1961 Baker et al.
(Continued)

FOREIGN PATENT DOCUMENTS

DE 298 04 085 U1 5/1998
DE 29804085 U1 5/1998
(Continued)

OTHER PUBLICATIONS

Johannaber, F. et al., "Bauarten von Spritzgiessmaschinen", Handbuch Spritzgiessen, Nov. 13, 2001, pp. 1020-1021, Carl Hanser Verlag, Muenchen, Germany, URL: http://www.beck-shop.de/fachbuch/leseprobe/9783446156326_excerpt_003.pdf—English translation.

(Continued)

*Primary Examiner* — Tim Heitbrink
(74) *Attorney, Agent, or Firm* — McAndrews, Held & Malloy, Ltd.

(57) ABSTRACT

An injection molding machine for producing molded parts has a machine table with a base frame on which three supporting elements with a baseplate disposed thereon are arranged. The base plate has a temperature-control element.

20 Claims, 8 Drawing Sheets

(51) Int. Cl.
  *B29C 45/04* (2006.01)
  *B29C 45/17* (2006.01)
  *B29C 33/06* (2006.01)
  *B29C 45/00* (2006.01)
  *B29C 45/73* (2006.01)

(52) U.S. Cl.
  CPC ............. *B29C2945/76531* (2013.01); *B29C 2945/76585* (2013.01)

(56) References Cited

U.S. PATENT DOCUMENTS

| | | | | |
|---|---|---|---|---|
| 3,464,091 | A | * | 9/1969 | Bielfeldt ................ 425/574 |
| 4,652,227 | A | * | 3/1987 | Aoki ...................... 425/576 |
| 6,827,571 | B2 | * | 12/2004 | Herbst ................... 425/556 |
| 2008/0168855 | A1 | | 7/2008 | Giefer et al. |
| 2008/0256789 | A1 | | 10/2008 | Fisch et al. |

FOREIGN PATENT DOCUMENTS

| | | |
|---|---|---|
| DE | 102005006628 A1 | 8/2006 |
| DE | 102009023598 A1 | 1/2010 |
| JP | 07323453 H | 12/1995 |
| JP | 11105060 H | 4/1999 |
| JP | 2001030323 A | 2/2001 |
| JP | 2008018535 A | 1/2008 |
| SU | 1 799 327 A3 | 2/1993 |
| SU | 1799327 A3 | 2/1993 |

OTHER PUBLICATIONS

Menges et al "How to make injections molds", 2001, Carl Hanser Verlag, Muenchen, pp. 318-319, XP002669284.

Johannaber, F., et al., "Bauarten von Spritzgiessmaschinen", Handbuch Spritzgiessen, Nov. 13, 2001, pp. 1020-1021, Carl Hanser Verlag, Muenchen, Germany, URL: http://www.beck-shop.de/fachbuch/leseprobe/9783446156326_excerpt_003.pdf.

* cited by examiner

FIG. 11
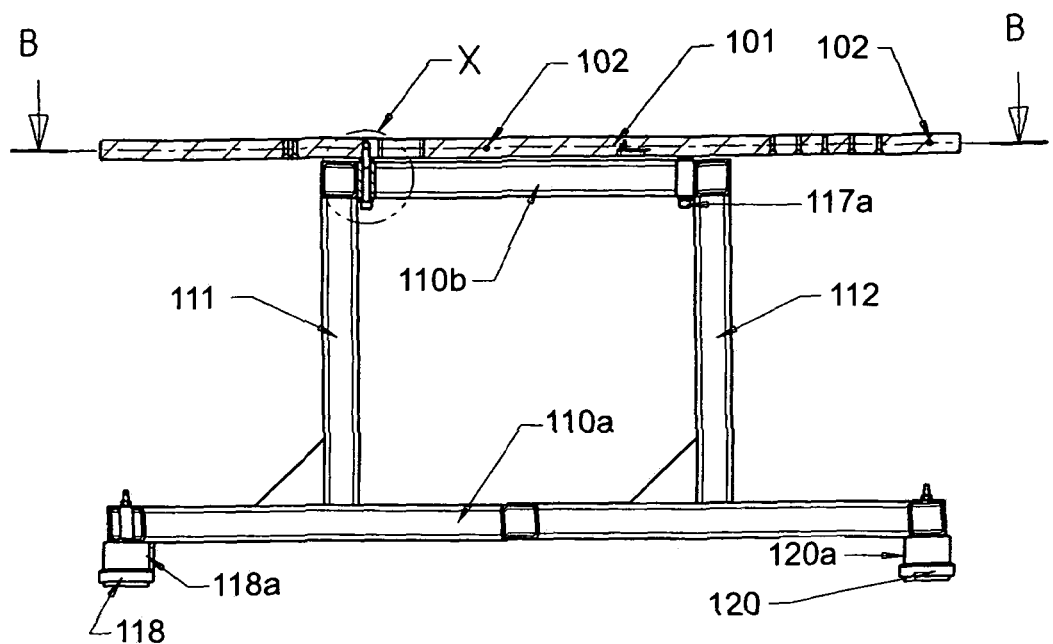
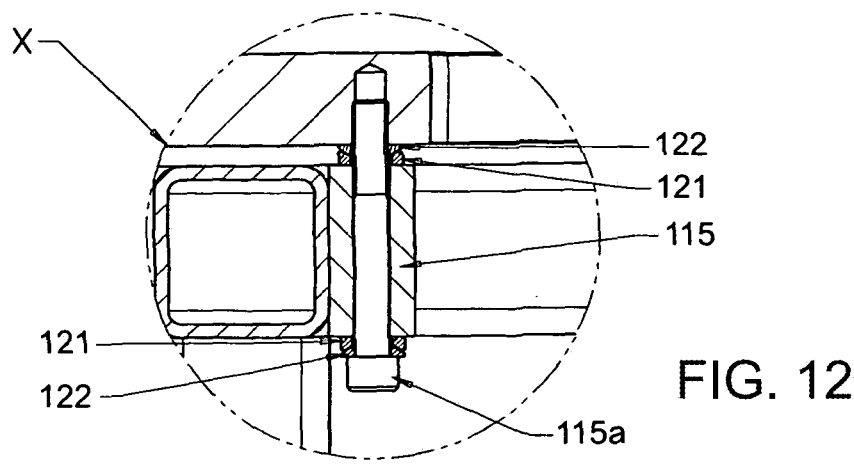
FIG. 12

INJECTION MOLDING MACHINE HAVING A TRANSPORT DEVICE DISPOSED ON A BASEPLATE

CROSS-REFERENCE TO RELATED APPLICATIONS

This application claimes benefit of priority from German (DE) Patent Application Nos. 10 2010 048 657.4 and 10 2010 048 658.2, both filed Oct. 15, 2010, and PCT No. PCT/EP2011/005203, filed Oct. 17, 2011, all of which are herein incorporated by reference in their entirety.

BACKGROUND

The invention relates to an injection molding machine for manufacturing molded parts.

Such an injection molding machine is known from DE 298 04 085 U1. It comprises a base-plate on which a plurality of machine parts are disposed; i.e. a plasticizing and injection mechanism, a multi-part molding tool and a mechanism to open, close and turn a mold half of the molding tool. The temperature of the baseplate changes during operation, whereby a movement of material occurs due to which the machine parts disposed on the baseplate change position. This is disadvantageous since the machine parts can thereby no longer be precisely aligned to one another, which can further result in functional impairment or malfunction.

It is the object of the invention to design an injection molding machine of the type cited at the outset such that it has a low temperature drift.

SUMMARY OF THE INVENTION

In accordance with the invention, this object is accomplished by the baseplate comprising a temperature control element. The possibility thereby exists of selectively changing the temperature of the baseplate. Should the temperature of the baseplate drop for example due to external influences, the temperature control element will supply heat to it; i.e. the baseplate will be heated. Should the temperature of the baseplate rise due to external influences, the temperature control element will withdraw heat from it; i.e. the baseplate will be cooled. The temperature control element prevents thermal stress in the baseplate and the machine parts disposed on same.

Being able to keep the baseplate at a specific temperature prevents a thermal-based material movement of the baseplate. A material movement of the affixed components and handling devices mounted to the baseplate can additionally be prevented. Thus, the precisely aligned mounting of the affixed components relative one another will be maintained during operation of the respective mechanism. The baseplate can moreover for example warm or cool its environment. Thus, a baseplate designed in accordance with the invention can for example cool the interior of a housing in which said baseplate is arranged.

In one preferred embodiment of the invention, the baseplate comprises at least one sensor to detect the plate temperature. The temperature of the baseplate can thereby be regulated to a constant predetermined value by means of a regulating device.

The temperature control element is advantageously formed by channels through which a heat transfer medium can be channeled. The temperature control element can thereby be of a simple construction. A temperature control element formed in this way is moreover very effective and sturdy.

The channels advantageously run parallel to the plane of the baseplate. This allows a very effective influencing of the baseplate temperature. For example, specific areas of the baseplate can be subject to greater cooling and/or heating by a specific routing of the channels. This is then particularly advantageous when certain areas of the baseplate are exposed to greater thermal influences than other areas.

It is very advantageous for the channels to be arranged such that the neutral axis of the channels is consistent with the neutral axis of the baseplate. To this end, the channels run substantially at the center of the plate thickness. This is on the one hand advantageous in terms of the baseplate stability and on the other hand allows channels of greatest possible cross section to be manufactured.

This is particularly applicable when the channels are formed in bores realized in the end faces of the baseplate, as a further particular embodiment of the invention provides. This allows a very easy and economical manufacturing of the channels.

A further particular embodiment of the invention provides for the channel inlets/outlets to be connected in part via connecting elements. Doing so thereby allows readily influencing the rate of the heat transfer medium through the channels.

A further particular embodiment of the invention moreover provides for a pump, by means of which the heat transfer medium can be intermittently pumped through the channels. Having the heat transfer medium being pumped through the channels in intervals achieves the heat transfer medium also flowing through remote areas of the channels. To this end, the pump only needs to be operated in full-load operation during the intervals.

A further particular embodiment of the invention furthermore provides for the baseplate to have air passage openings. Doing so increases the baseplate's thermal influencing of the environment of said baseplate. In other words, the baseplate can better cool or, if needed, warm the baseplate's environment.

In one preferred embodiment of the invention, the injection molding machine comprises a machine table having a base frame on which three supporting elements with a baseplate disposed thereon are affixed.

The baseplate is thus affixed to the base frame without tension. Since three points of support always span a flat surface, it is no longer necessary to mill off the elements of the frame on which the plate rests so they will span a flat surface. The fact that milling no longer needs to be performed is very advantageous in terms of costs. Moreover, there is no longer any risk of the milling not being precise enough, which could then otherwise lead to the baseplate not being disposed on the base frame without tension.

The base frame advantageously comprises a lower frame disposed on three feet. This advantageously achieves likewise arranging the base frame so as to be without tension on an uneven support. When the feet are height-adjustable, as is the case in a particular embodiment of the invention, this allows the horizontal disposing of the lower frame, or a baseplate arranged on the lower frame respectively.

The feet preferably comprise rubber mount elements. This thereby achieves being able to easily isolate the baseplate from vibrations introduced into the ground surface due to e.g. harsh environmental conditions.

In a further particular embodiment of the invention, the base frame comprises an upper frame which is connected to the lower frame by means of supports. This thereby allows the base-plate to be disposed at a greater distance from the ground surface.

The supporting elements are advantageously affixed to the upper frame. This thereby allows the baseplate to be directly affixed to the supporting elements.

To affix the baseplate to the supporting elements, the latter advantageously have a conical recess in which a hemispherically configured support engages. This thereby achieves the baseplate being able to be flatly connected to the support which thereby prevents tension from developing when e.g. screwing the baseplate onto the supporting elements, which could lead to warping of the baseplate.

In one preferred embodiment of the invention, the injection molding machine comprises an injection station on the baseplate in which melt can be introduced into the cavity of a molding tool which corresponds to the molded part and has at least one first mold part and one second mold part and is able to be brought into an open and closed position, wherein the first mold part has at least one runner and the cavity is at least partially arranged in the second mold part; arranged on the baseplate is a cooling station as well as a separating station to separate and remove the sprue; an ejection station to eject the molded part and a transport device arranged on the baseplate which comprises at least one transport route connecting the stations on which the second mold part can be transported from one station to another station with a molded part in the cavity where applicable; the first mold part being arranged stationary on a machine nozzle and the second mold part being moved along the transport route separate from the first mold part; the first mold part exhibiting a heat-dissipating area made from a material which is of good thermal conductivity; and the heat-dissipating area being able to be brought into thermal contact with a cooling area of the cooling station such that the cooling area is distanced from the molded part. It is thereby advantageously possible to open the mold after the injection molding process is finished but yet prior to the complete solidification of the melt and then only transport the second mold part together with the molded part situated therein to the cooling station. At the cooling station, the heat-dissipating area of the second mold part is brought into thermal contact with the cooling area of the cooling station in order to cool the second mold part and the molded part situated therein. Since the molded part is still relatively soft and malleable at the start of the cooling procedure, direct contact between the cooling station, the cooling area respectively, and the molded part is prevented. The first mold part remains on the machine nozzle and is not cooled. The injection molding machine according to the invention enables rapidly cooling the molded part so that it can thereafter be removed from the second mold part. Since only the second mold part of the mold is cooled, the injection molding machine enables energy-saving operation. The injection molding machine moreover saves space.

Because the transport device comprises a transport route connecting the stations on which the molded part can be moved from one station to another station, a plurality of molded parts can be transported at the same time. Thus, for example, one molded part can be transported from the injection station to a cooling station and one molded part can be transported from the cooling station to a demolding station at the same time. By the baseplate having a temperature-control element, the moving second mold part can thereby be exactly positioned at the individual stations.

In one preferred embodiment of the invention, the cooling area exhibits a cooling element able to be moved toward and away from the heat-dissipating area which can be brought into thermal contact with the heat-dissipating area to directly cool the second mold part. The cooling element can thereby be in planarly contact with the heat-dissipating area so that the second mold part with the molded part situated therein can be accordingly cooled rapidly. The cooling element is preferably designed as a cooling plate.

It is advantageous to dispose a heating station as a further station on the transport route. The heating station is thereby arranged after the cooling station in the transport direction such that the second mold part can be preheated before being positioned at the injection station. Warming the second mold part has the advantage of the melt injected into the cavity only cooling very slowly during the injection procedure. This thereby allows the manufacturing of very delicate and intricate molded parts. Because the slower the melt cools during the injection molding, the better the molded part can be molded. In the further station designed as a heating station, the relevant tool, the relevant second mold part respectively, can be heated in two stages by means of induction. To this end, the mold part only need be arranged in front of the inductor and the induction started. Additional elements are essentially no longer necessary. Because the mold part is warmed in two stages, it can be preheated in the first stage and heated to its desired final temperature in the second stage. Heating the mold parts to their final temperature can thus occur within a considerably shortened cycle time.

It is expedient to actively cool the cooling element. The second tool part can thereby be cooled faster. In addition, the cooling element can be of correspondingly compact size.

In one preferred embodiment of the invention, the cooling element comprises at least one coolant channel through which a cooling fluid can flow. Water is thereby preferably used as the cooling fluid. The mold half can thereby advantageously be cooled by a water-cooled aluminum plate being pressed against the surface of the mold half by means of a pneumatic cylinder, which thereby produces contact cooling.

In one apt design of the invention, the cooling element can be moved toward and away from the mold part transverse to the latter's direction of transport. The injection molding machine thereby enables a simple structuring.

The injection molding machine advantageously comprises a pressing mechanism by means of which the cooling element can be pressed planarly against the second mold part. Heat can thereby be conveyed even faster from the second mold part to the cooling area of the cooling station.

In another advantageous design of the invention, the cooling station comprises at least one gas outlet in the cooling area from which a cooling gas can flow directly onto the heat-dissipating area. The heat-dissipating area can thereby be cooled without contacting the cooling station. To prevent deformation of the molded part, the gas outlets are designed so as to prevent cooling gas from blowing directly onto the molded part.

When the transport route forms a closed loop, as a particular embodiment of the invention provides, then the mold-tool preheated in the heating station can moreover be re-transported back to the injection station again. Simultaneously transporting the tool between the stations considerably reduces the cycle time of the injection molding machine. It is only limited by the longest dwell time the tool spends in a station.

The transport route advantageously comprises linear conveyors which are connected together at 90 degree rotation at their ends. The connection of the linear conveyors at their ends is advantageously realized by rotary actuators. Instead of linear conveyors, the transport route could also be formed as a conveyor belt extending through the processing stations, or running along the processing stations respectively. Because the transport route consists of linear conveyors which form a closed loop, the essential parts of the injection molding machine can be arranged within the transport route. This is very advantageous in terms of the space required for the injection molding machine.

The inventive injection molding machine allows the manufacturing of a molded part as follows: A molding tool situated in the injection station is closed. Melt is then injected into the cavity of the molding tool. The molding tool is then subsequently opened. The actual injection molding process is thereby finished.

At the same time as the injection molding process, in the cooling station which is disposed outside of the injection station a molded part respectively the corresponding second mold part, can be cooled. Likewise simultaneous to the injection molding process, a molded part situated in a station also disposed outside of the injection station can be ejected from the sprue and the sprue expelled. In addition simultaneous to the injection molding process, a molded part situated in a station also disposed outside of the injection station can be ejected from the mold part arranged in the respective station. Lastly, a mold part situated in a heating station can be heated at the same time as the injection molding process.

After the injection molding process is finished, the molded part, or the second mold part in which the molded part is situated respectively, can be transported from the injection station to the cooling station in the course of a transport step. The mold part situated in the cooling station can be transported from the cooling station to the station at which the molded part is extracted from the sprue during the course of the transport step. Moreover, the second mold part situated in the station in which the molded part is extracted from the sprue can at the same time during the course of the transport step be transported from that station to the station in which the molded part is ejected from the second mold part. In addition, the mold part situated in the station in which the molded part is expelled can at the same time during the course of the transport step be transported from that station to the heating station. Lastly, the mold part situated in the heating station can be transported from the heating station to the injection station during the course of the transport step.

During the transport step, all respective second mold parts can thus be simultaneously transported from one station to the next station. Therefore, not only can the different sub-processes realized in manufacturing a molded part take place substantially simultaneously with the inventive injection molding machine but also the transporting of the molded part to the various processing stations as well. This is very advantageous in terms of the injection molding machine's cycle time.

Because a cooling station is provided, the time required for the molded part to cool down enough to be demolded is greatly reduced. This particularly becomes apparent when the molded part and/or the sprue is of voluminous design.

A further specific embodiment of the invention provides for the injection station to comprise a centering element to center the second mold part introduced into the injection station. Doing so advantageously achieves the transport device not needing to position the second mold part with absolute precise positioning. The transport device can thus be of correspondingly simple and thus economical construction.

BRIEF DESCRIPTION OF THE DRAWINGS

Further details, features and advantages of the present invention will yield from the following description of a specific embodiment making reference to the drawings, which show.

DETAILED DESCRIPTION OF THE INVENTION

Figure 1:
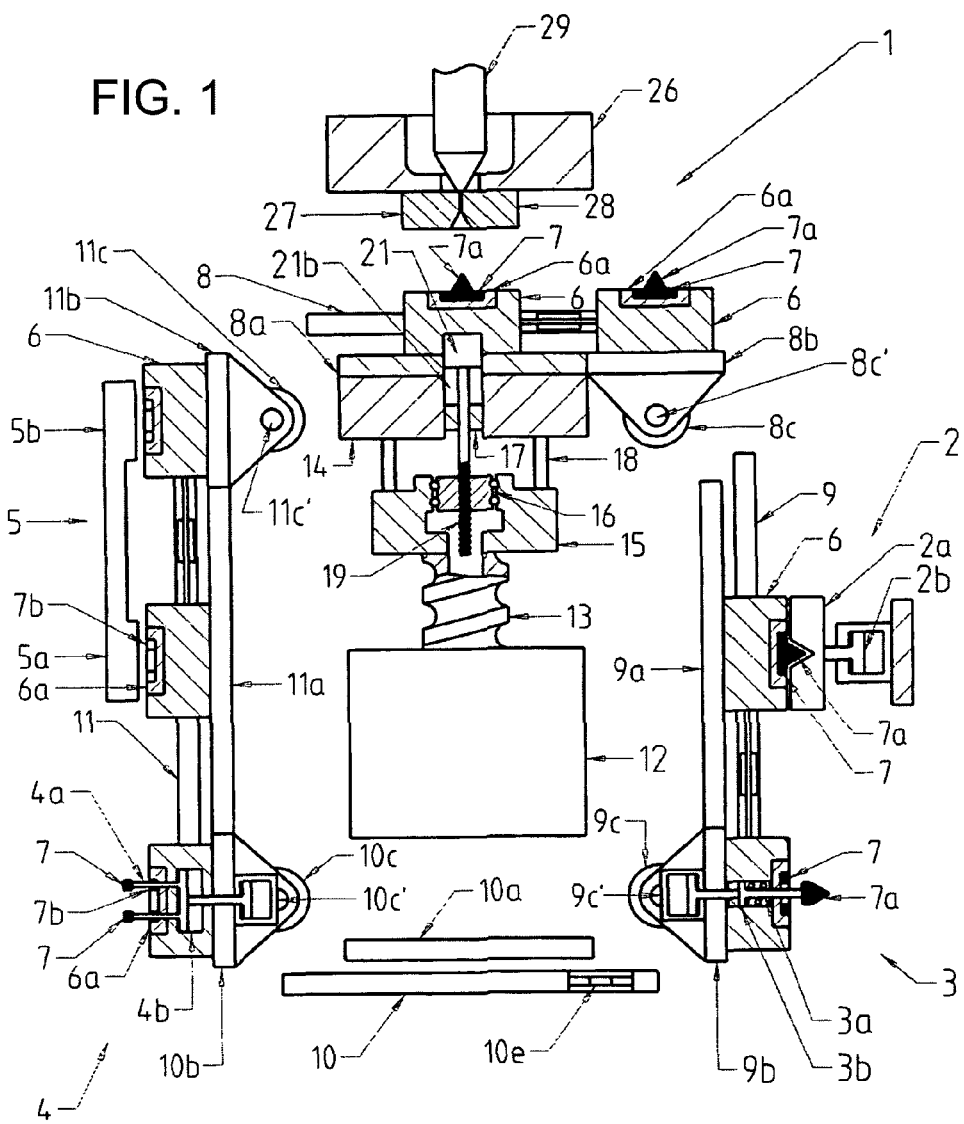
FIG. 1 a schematic plan view depiction of an injection molding machine according to the invention, FIG. 2 an enlarged detail of the centering function of the injection station from FIG. 1 in a first state reflecting the view represented by arrow X, FIG. 3 the enlarged detail depicted in FIG. 2 in a second state reflecting the view represented by the arrow X, FIG. 4 a sectional view along the A-A lines of intersection in FIG. 3 reflecting the view represented by arrow Y, FIG. 5 the respective elements of the transport device of the injection molding machine depicted in FIG. 1 reflecting the view represented by the arrow X, FIG. 6 a perspective view of the baseplate of the injection molding machine, FIG. 7 a sectional plan view of the baseplate depicted in FIG. 6 with schematically arranged operating elements, FIG. 8 a perspective view of the machine table of the injection molding machine from above, FIG. 9 a perspective view of the base frame of the machine table depicted in FIG. 8 from above, FIG. 10 a perspective view of the machine table depicted in FIG. 8 from below, FIG. 11 a side sectional view of the machine table depicted in FIG. 8 along the A-A lines of intersection from FIG. 8, and FIG. 12 the X detail from FIG. 11.

As can be noted from FIG. 1, a molding tool is disposed in an injection station 1 of an injection molding machine 100 which comprises a stationary first mold part 28 connected to a machine nozzle 29 and an moveable second mold part 6. The mold parts 6, 28 are designed as respective mold halves. They can be moved toward and away from one another and can be brought into an open position as depicted in FIG. 1 as well as a closed position.

The moveable second mold part 6 exhibits a recess in which a mold cavity 6a comprising a cavity 7b is disposed. The second mold part 6 is adjusted by means of a ball screw spindle 13 powered by a drive 12. The ball screw spindle 13 displaces a pressure plate 15 which is connected to a movable mold clamping plate 14 via thrust pin 18. A slide rail 8a on which the second mold part 6 is arranged to be laterally movable is disposed on the movable mold clamping plate 14 on the opposite side from the thrust pin 18.

The first non-moveable mold part 28 is disposed on a likewise non-moveable mold clamping plate 26 opposite the second mold part 6. The non-moveable first mold part 28 comprises a runner 27 into the center of which the machine nozzle 29 can introduce melt.

When the ball screw spindle 13 presses the second mold part 6 against the first mold part 28, the cavity 7b formed in mold cavity 6a is closed. The melt flowing through runner 27 can then fill the entire space of cavity 7b under pressure.

A first pivotable slide rail 8b is disposed to the right next to the first slide rail 8a in FIG. 1, same being pivotable by 90 degrees about an axis 8c' by means of a rotary actuator 8c. This allows the first pivotable slide rail 8b to be brought from the position depicted in FIG. 1, in which it is aligned with the first slide rail 8a, into a position in which it is aligned with a second slide rail 9a arranged at an approximate 90 degree angle to the first slide rail 8a. A second mold part 6 disposed on the first slide rail 8a can thus be transported by first moving on the first pivotable slide rail 8b and, subsequent pivoting of the first pivotable slide rail 8b, on the second slide rail 9a.

A further station designed as a cooling station 2 is disposed on the second slide rail 9a. The cooling station 2 comprises a water-cooled aluminum plate 2a which can be pressed by a pneumatic cylinder 2b against a second mold part 6 situated in the cooling station 2. The contact cooling thereby produced cools the moveable second mold part 6 and in particular the molded part 7 together with sprue 7a situated in said second mold part 6.

A second pivotable slide rail 9b is disposed underneath second slide rail 9a in FIG. 1, same being pivotable by 90 degrees about an axis 9c' by means of a rotary actuator 9c. This allows the second pivotable slide rail 9b to be brought from the position depicted in FIG. 1, in which it is aligned with the second slide rail 9a, into a position in which it is aligned with a third slide rail 10a arranged at an approximate 90 degree angle to the second slide rail 9a. A second mold part 6 disposed on the second slide rail 9a can thus be transported by first moving on the second pivotable slide rail 9b and, subsequent pivoting of the second pivotable slide rail 9b, on the third slide rail 10a.

A further station 3 designed as a separating station 3 is disposed on the second pivotable slide rail 9b in which the sprue 7a of the molded part 7 is separated from the latter and expelled. The expelling occurs by means of a tappet 3a displaced by a pneumatic cylinder 3b.

As can moreover be noted from FIG. 1, a fourth slide rail 11a is disposed to the left of the third slide rail 10a and extends at an approximate 90 degrees angle to the third slide rail 10a. A third pivotable slide rail 10b is disposed at the lower end of the fourth slide rail 11a in FIG. 1, same being pivotable by 90 degrees about an axis 10c' by means of a rotary actuator 10c. This allows the third pivotable slide rail 10b to be brought from the position depicted in FIG. 1, in which it is aligned with the fourth slide rail 11a, into a position in which it is aligned with the third slide rail 10a. A second mold part 6 disposed on the third slide rail 10a can thus be transported by first moving on the third pivotable slide rail 10b and, subsequent pivoting of the third pivotable slide rail 10b, on the fourth slide rail 11a.

An ejection station 4 is disposed on the third pivotable slide rail 10b as a further station in which a molded part 7 still situated in the cavity 7b of a mold part 6 located in station 4 can be expelled from the cavity 7b. The expelling occurs by means of a tappet 4a displaced by a pneumatic cylinder 4b.

A further station designed as a heating station 5 is disposed on the fourth slide rail 11a. The heating station 5 comprises an inductor by means of which a second mold part 6 situated in a first part 5a of the heating station 5 can be preheated to a first temperature. In a second part 5b of the heating station 5, a second mold part 6 situated in the second part 5b of the heating station 5 is heated to its desired final temperature.

A fourth pivotable slide rail 11b is disposed above the fourth slide rail 11a in FIG. 1, same being pivotable by 90 degrees about an axis 11c' by means of a rotary actuator 11c. This allows the fourth pivotable slide rail 11b to be brought from the position depicted in FIG. 1, in which it is aligned with the fourth slide rail 11a, into a position in which it is aligned with the first slide rail 8a arranged at an approximate 90 degree angle to the fourth slide rail 11a. A second mold part 6 disposed on the fourth slide rail 11a can thus be transported by first moving on the fourth pivotable slide rail 11b and, subsequent pivoting of the fourth pivotable slide rail 11b, on the first slide rail 8a.

The respective second mold part 6 can be transported into the injection station 1 on the first slide rail 8a. When the second mold part 6 reaches its position in the injection station 1, a centering pin 21 arranged in an opening 21a of the second mold part 6 is drawn into an opening 21a formed in the slide rail 8a. This thereby ensures that the second mold part 6 is in a required exact position in the injection station 1 for performing the injection molding process. The centering pin 21 is arranged on a second ball screw spindle 19 which is driven by a ball bearing drive 16. The second ball screw spindle 19 is supported in the movable mold clamping plate 14 by means of a bearing 17. The structure of the centering mechanism is depicted more clearly in FIGS. 2 and 3.

Figure 2:
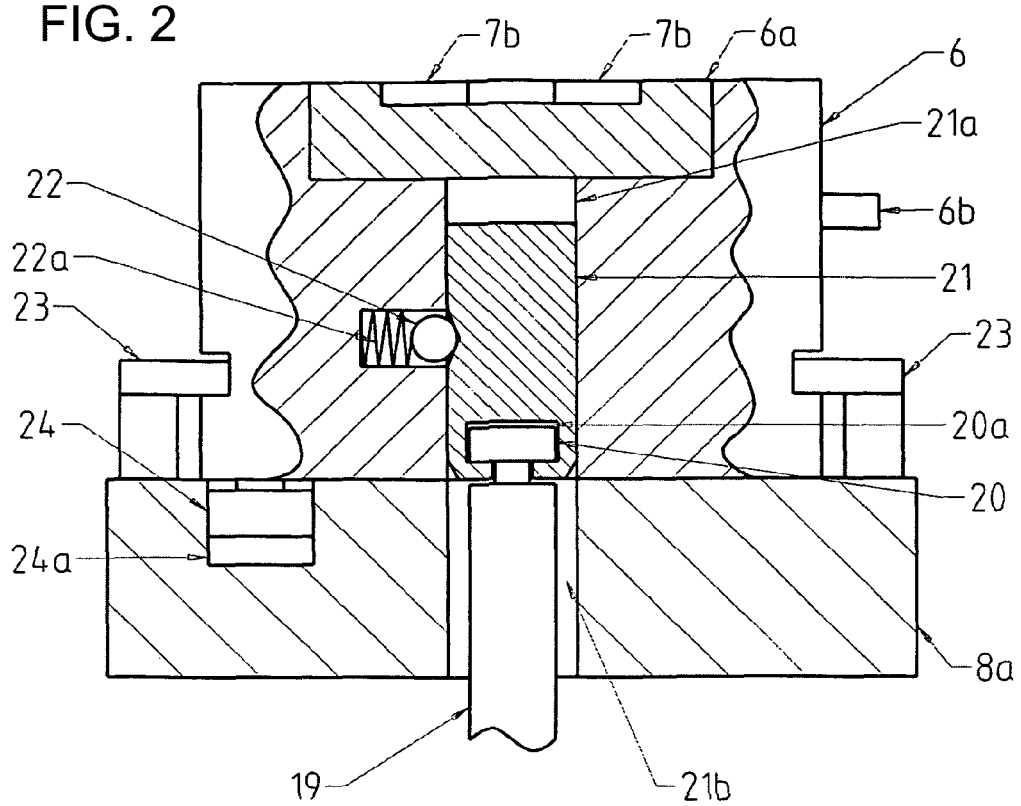

As can be noted from FIG. 2, the centering pin 21 is arranged in the opening 21a of the second mold part 6 in which a tappet to eject the molded part is usually disposed. The centering pin 21 exhibits a T-groove-shaped recess 20a in which a corresponding T-shaped head 20 of the ball screw spindle 19 is disposed. The ball screw spindle 19 is arranged such that the head 20 enters the T-groove-shaped recess 20a of the centering pin 21 upon the second mold part 6 being moved.

The centering pin 21 further comprises a recess formed on its periphery in which a ball 22 engages. This thereby holds the centering pin 21 in its position when the second mold part 6 is not on a slide rail. Ball 22 is pressed into the recess by the force generated by a spring 22a.

To facilitate the introducing of the centering pin 21 into the opening 21 of the first slide rail 8a, the centering pin 21 comprises corresponding chamfers at its end facing opening 21b.

Figure 3:
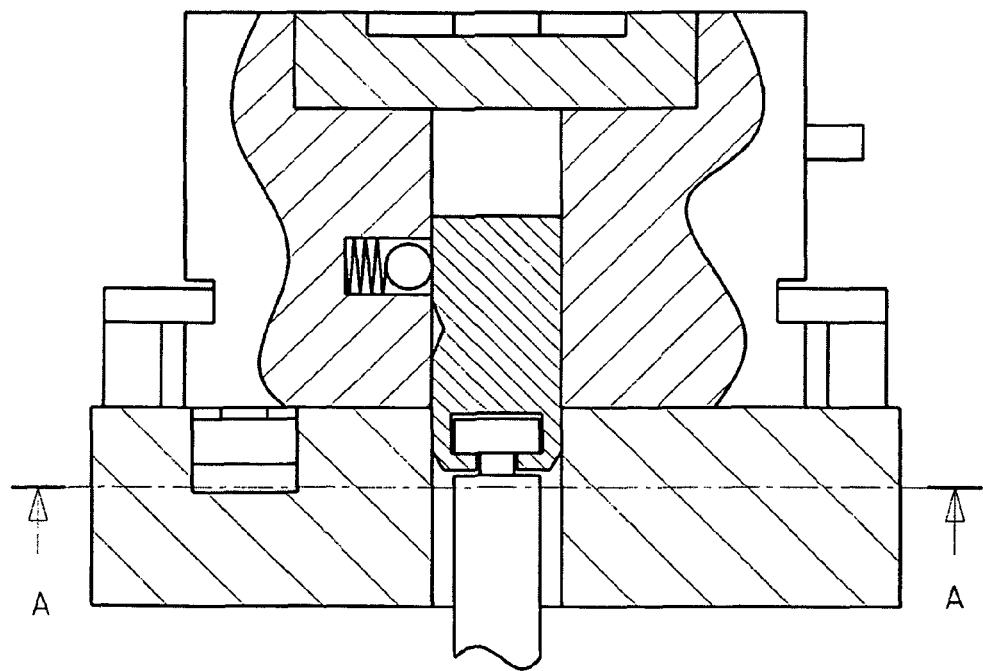

In FIG. 3, the centering pin 21 is partially disposed in opening 21b. The second mold part 6 is thereby in an accurate position. In all other respects, FIG. 3 corresponds to FIG. 2. For this reason, the reference numerals have been omitted.

Guide elements 23 are arranged on the first slide rail 8a which engage in correspondingly formed guide grooves of the second mold part 6. The first slide rail 8a furthermore comprises a bearing groove 24a, the walls of which are abutted by consecutively arranged rollers 24, 25 affixed to the second mold part 6. The rollers 24, 25 support the second mold part 6 in the first slide rail 8a.

Figure 4:
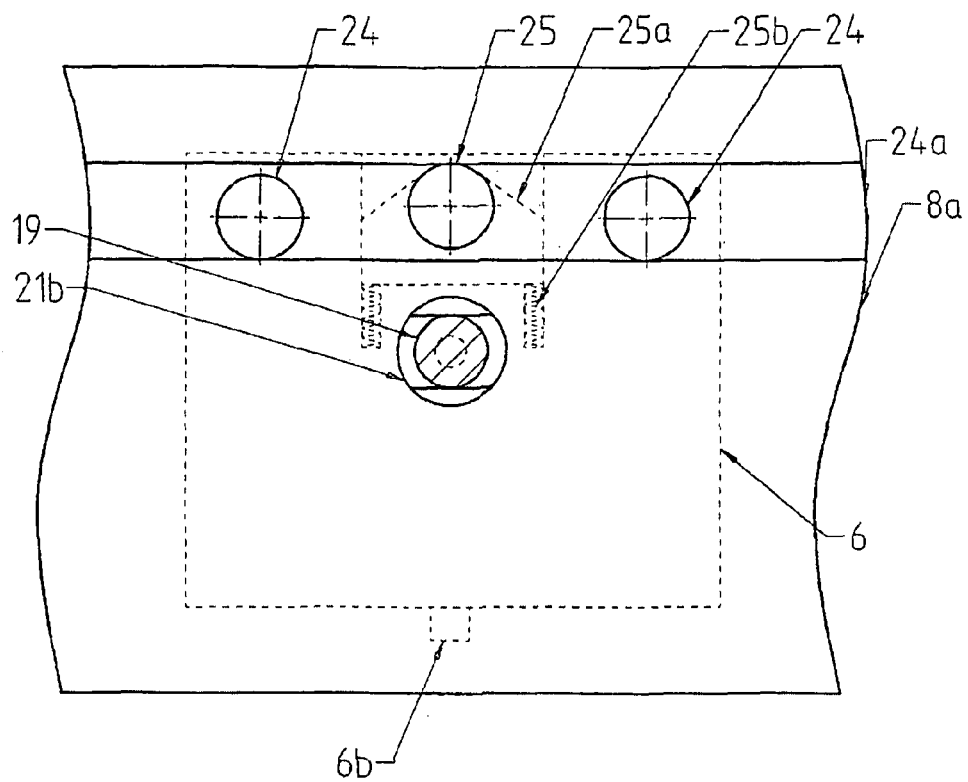

As can particularly be noted from FIG. 4, to improve the bearing, the roller 25 arranged between two outer rollers 24 are affixed to a slider 25a which is subjected to the force of two springs 25b. The spring action is such that the center roller 25 is pressed to the upper wall of the groove 24a and the outer rollers 24 are pressed against the lower wall of the groove 24a.

The remaining slide rails 8b, 9a, 9b, 10a, 10b, 11a, 11b have substantially the same structure such that a detailed description of these slide rails can be dispensed with.

The lateral displacing of the second mold part 6 ensues by means of rodless pneumatic cylinders 8, 9, 10, 11, wherein the first pneumatic cylinder 8 effects the transport of the second mold parts 6 arranged on the first slide rail 8a, the second pneumatic cylinder 9 effects the transport of the second mold parts 6 arranged on the second slide rail 9a, the third pneumatic cylinder 10 effects the transport of the second mold parts 6 arranged on the third slide rail 10a, and the fourth pneumatic cylinder 11 effects the transport of the second mold parts 6 arranged on the fourth slide rail 11a. The lateral displacing function will be described using the example of the arrangement of the second pneumatic cylinder 9 and the second slide rail 9a depicted in FIG. 5.

Figure 5:
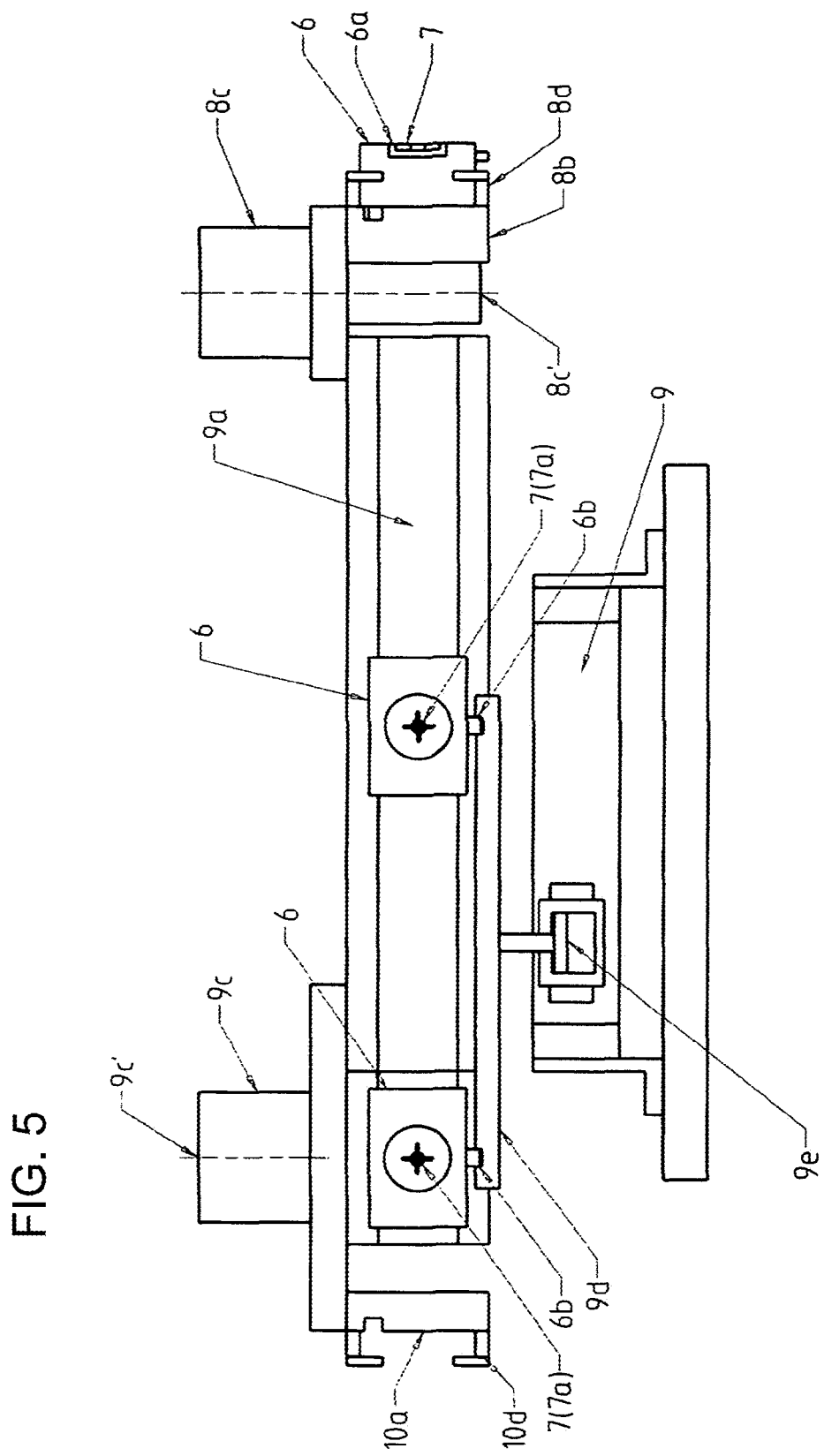

As can be noted from FIG. 5, a short-stroke cylinder 9e is arranged on the actuator of the second pneumatic cylinder 9, the plunger of which is connected to a rail 9d. The rail 9d exhibits recesses in which the protrusions 6b disposed on the second mold part 6 engage. When the protrusions 6b are situated in the recesses of the rail 9d, the respective second mold parts 6 are laterally displaceable by means of the rodless second pneumatic cylinder 9.

In the position depicted in FIG. 5, the second mold part 6 disposed on the left in FIG. 5 is situated in station 3 in which the sprue 7a is expelled and the second mold part 6 depicted on the right in FIG. 5 is in the cooling station 2. Stations 2 and 3 are not depicted for reasons of clarity.

As the second mold parts 6 are situated in stations 2 and 3, the short-stroke cylinder 9e can preferably be actuated during the time the processes are being performed in stations 2 and 3 such that rail 9d is lowered, whereby the protrusions 6b of the second mold part 6 are no longer engaged with the rail 9d. The second pneumatic cylinder 9 is thereupon actuated such that the short-stroke cylinder 9e, and thus rail 9d, are moved to the right.

Prior or simultaneous to the second pneumatic cylinder 9 being actuated, the first pivotable slide rail 8b is actuated such that it is aligned with the second slide rail 9a. In so doing, a second mold part 6 situated on the first pivotable slide rail 8b comes into a position in which the recess of the rail 9d to the right in FIG. 5 is below the protrusion 6b of the respective second mold part 6. The left recess of the rail 9d in FIG. 5 is then situated below the protrusion 6b of the second mold part 6 situated in the cooling station 2.

Actuating the short-stroke cylinder 9e moves rail 9d upward so that the protrusions 6b of the two respective second mold parts 6 enter the recesses of the rail 9d.

After the sprue 7a in station 3 has been expelled, the second pivotable slide rail 9d is pivoted such that it is aligned with the third slide rail 10a. If this is the case, the second mold part 6 situated on the second pivotable slide rail 9b is pushed from the second pivotable slide rail 9b to the third slide rail 10a and the second pivotable slide rail 9b pivots back into its initial position.

After this being the case and the relevant second mold part 6 being cooled in the cooling station 2, the second pneumatic cylinder 9 is actuated such that the second mold part 6 situated in the cooling station 2 is shifted into station 3 in which the sprue 7a is expelled as well as the second mold part 6 situated on the first pivotable slide rail 8b being shifted into the cooling station 2. The operations to be performed in stations 2 and 3 as well as the above-described process are thereupon repeated.

The above-described transport also occurs in virtually identical manner with the first slide rail 8a and the fourth slide rail 11a. The transport of the second mold part 6 on the third slide rail 10a only differs from the above-described transport in that only one second mold part 6 is transported in each case. Meaning that an element corresponding to rail 9d is not needed in the transport of the second mold part 6 on the third slide rail 10. After being correspondingly shifted, the actuator 10e of the third pneumatic cylinder 10 is in direct operative connection with the protrusion 6b of the relevant second mold part 6. A second mold part 6 disposed on the second pivotable slide rail 9b can thereby be moved over the third slide rail 9a directly to the third pivotable slide rail 10b by actuation of the third pneumatic cylinder 10.

The arrangement of the slide rails 8a, 8b, 9a, 9b, 10a, 10b, 11a, 11b depicted in FIG. 1 forms a closed loop in which the second mold part 6 can be continuously transported. It is hereby very advantageous for the essential components of the injection molding machine 100, such as for example the clamping unit, to be able to be arranged within the closed loop. Doing so achieves a very compact structure only needing little space.

Figure 6:
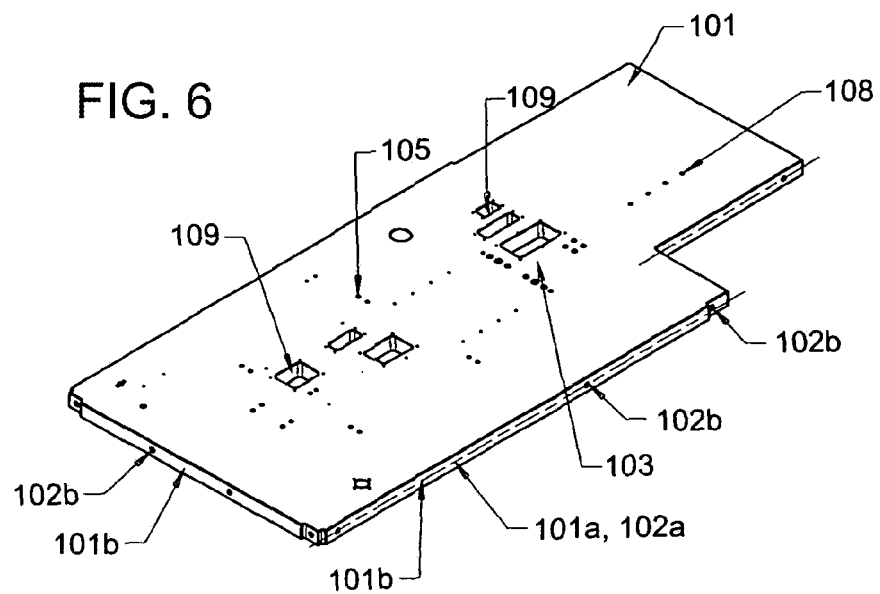

The injection molding machine 100 comprises the baseplate 101 schematically depicted in FIG. 6 on which the injection station 1, the cooling station 2, the separating station 3, the ejection station 4 and the transport device with transport routes 8a, 8b, 9a, 9b, 10a, 10b, 11a, 11b are arranged. As can be noted from FIGS. 6 and 7, the baseplate 101 exhibits channels 102 which run parallel to the plane of the baseplate 101. The channels 102 are designed as bores 102b drilled into the end faces 101b of the baseplate 101. The bores 102b are disposed at the center of the plate's thickness. Their neutral axes thereby follow a course consistent with the neutral axis of the baseplate 101.

The baseplate 101 further comprises openings 108 through which air can flow. The air passage openings 108 can serve to fix machine elements to be arranged on the baseplate 101. The baseplate 101 also further comprises cut-outs 109 for positioning machine elements.

Figure 7:
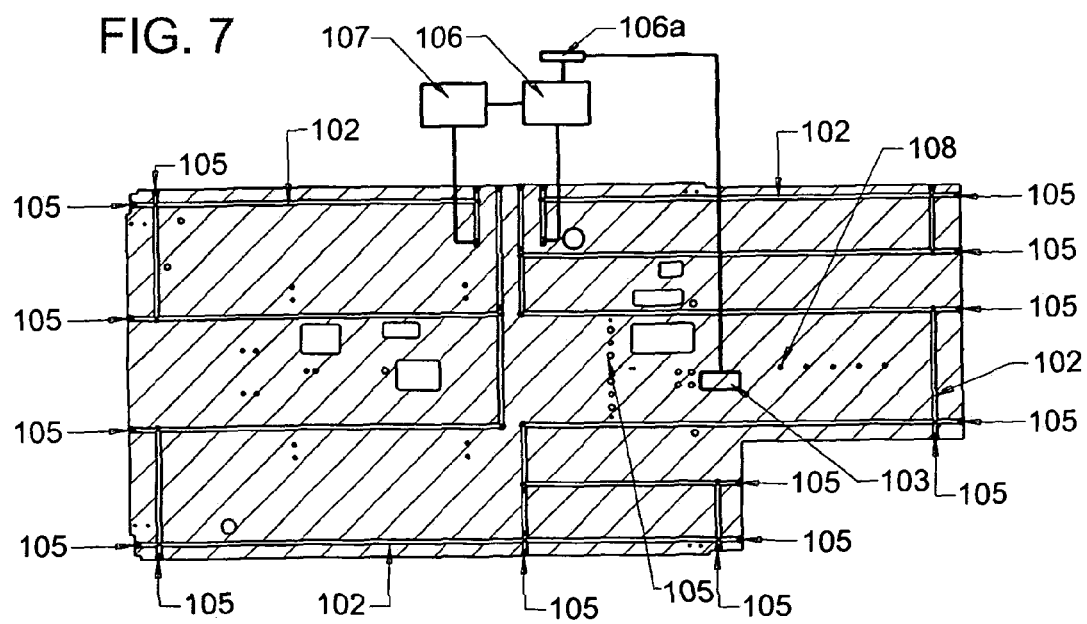

As can be noted from FIG. 7, the inlets/outlets of channels 102 are sealed in part by means of blind plugs 105. The inlets/outlets of channels 102 are moreover partly connected together by means of connecting elements 104. The connecting elements 104 can be conventional tubes comprising screw caps on their ends by means of which the tubes can be screwed into the openings of the bores 102b. The blind plugs 105 as well as the connecting elements 104 are connected to the bores 102b in standard fashion such a more detailed description thereof can be dispensed with.

Two of the openings 102b of the channels 102 disposed on the left in FIG. 7 are connected to a pump 106. The pump 106 pumps a coolant into the respective channels 102. The pump 106 draws the coolant from a heat exchanger 107 which for its part is connected to two of the openings 102b of the channels 102 disposed on the right in FIG. 7. The heat exchanger 107 allows the heating or cooling of the heat transfer medium to a predetermined temperature.

The controller 106a of the pump 106 is connected to a temperature sensor 103 arranged at plate 101. According to the plate temperature determined by the temperature sensor 103, the controller 106a triggers the pump 106 to pump heat transfer medium into the channels 102 at maximum output at more or less long intervals.

Figure 8:
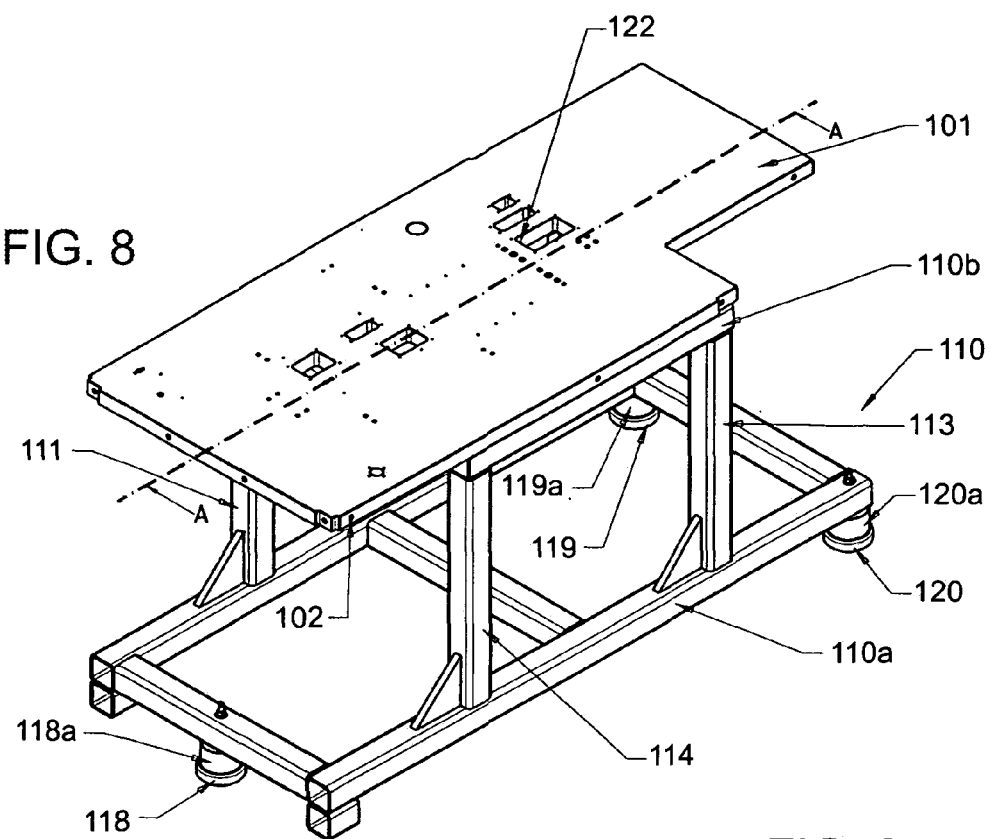

As can particularly be noted from FIG. 8, the baseplate 101 is arranged on a base frame 110 which together with the baseplate 101 forms a machine table. The base frame 110 consists of a lower frame 110a and an upper frame 110b which are welded together of square-end box spars. The upper frame 110b is connected to the lower frame 110a via supports 111, 112, 113, 114 which likewise consist of square-end box spars.

Figure 9:
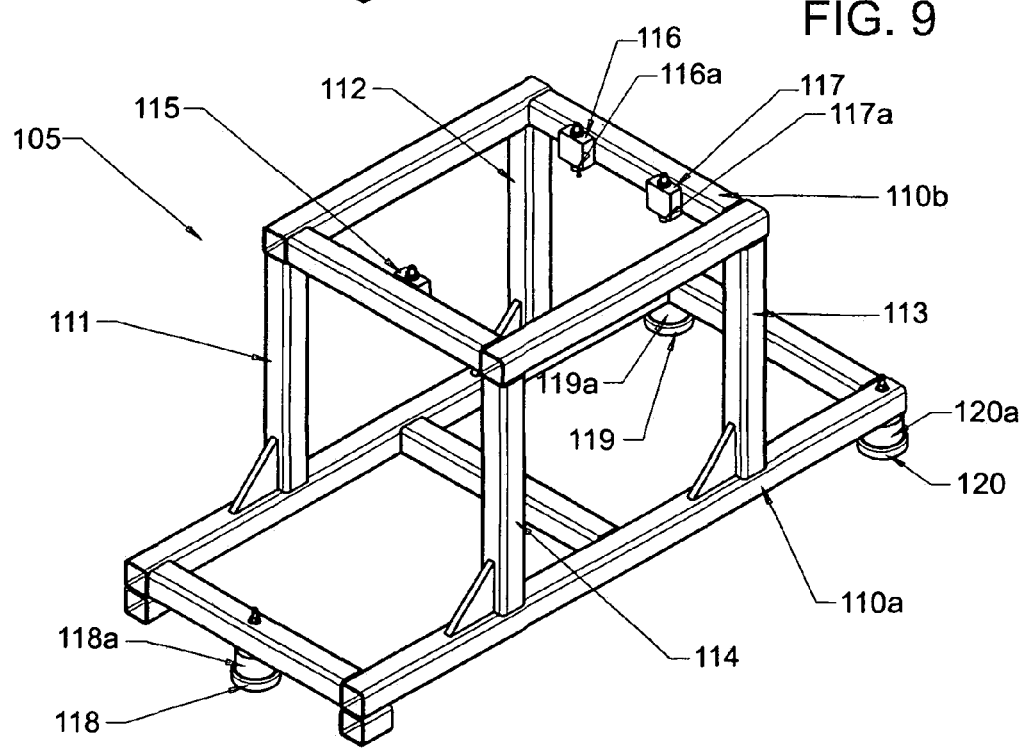

As can particularly be noted from FIG. 9, supporting elements 115, 116, 117 comprised of metal blocks are affixed (preferably welded) to the upper frame 110b, on top of which the baseplate 101 rests. Screws 115a, 116a, 117a extend through the supporting elements 115, 116, 117, by means of which the baseplate 101 can be screwed to the supporting elements 115, 116, 117. This is particularly discernible from FIG. 10.

The lower frame 110a exhibits machine feet 118, 119, 120 comprising rubber mount elements 118a, 119a, 120a. The lower frame 110a, and thus the entire machine table as a whole, is thereby cushioned against vibrations.

Figure 10:
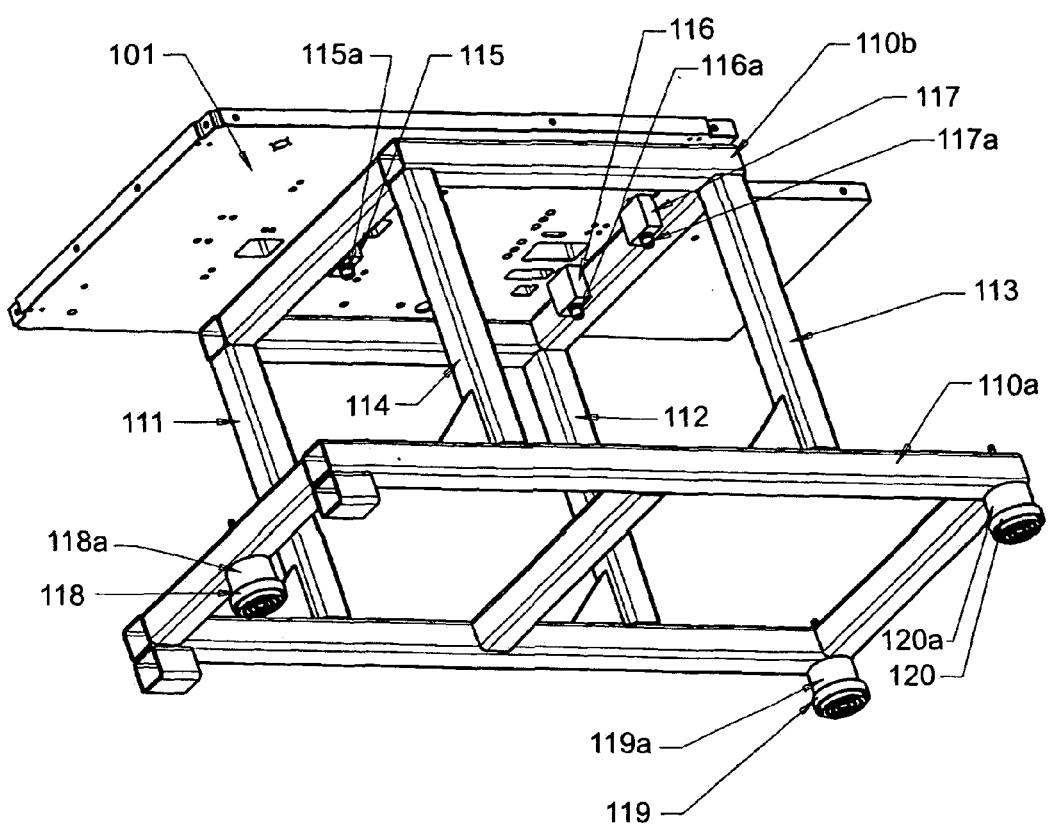

As can particularly be noted from FIGS. 10 and 11, disks 121 are arranged on the supporting elements 115, 116, 117, same comprising a bore through which the screws 115a, 116a, 117a extend. The bores are countersunk on their side facing the baseplate 101 so as to form a conical recess. A hemispherical element 122 having a flat side on its side facing away from the recess engages into the conical recess. The recess and the element 122 form a conic joint such that the baseplate 101 always has a flat support. This achieves not warping the baseplate 101 when it's screwed to the supporting elements 115, 116, 117.

A combination consisting of one of the disks 121 and the element 122 is also arranged between the head of the screws 115*a*, 116*a*, 117*a* and the supporting elements 115, 116, 117. This is particularly discernible from FIG. 11.

The baseplate 101 further comprises recesses as well as threaded holes which serve in the arranging, respectively affixing, of machine elements.

The invention claimed is:

1. An injection molding machine for manufacturing molded parts, comprising:
   a machine table having a base frame, three supporting elements disposed on said base frame and a base plate disposed on said supporting elements;
   an injection station disposed on said base plate, said injection station being configured to introduce melt into a mold cavity of a molding tool corresponding to the molded part;
   the molding tool comprising at least one first mold part and one second mold part which can be brought into an open and closed position, said first mold part having at least one runner and the cavity being formed at least partially in said second mold part, said first mold part being disposed at a machine nozzle and said second mold part being movable separately from said first mold part;
   a cooling station disposed on said baseplate separate from said injection station;
   an optional separating station for separating and removing a sprue from the mold part;
   an ejection station for ejecting the molded part disposed on said baseplate separate from said injection station;
   a transport device disposed on said baseplate and formed of at least one transport route connecting said stations and configured to transport said second mold part along said transport route and separately from said first mold part from one of said stations to another one of said stations with a molded part in said cavity where applicable.

2. The injection molding machine according to claim 1, wherein said second mold part is formed with a heat-dissipating area made from a material of good thermal conductivity and said heat-dissipating area is able to be brought into thermal contact with a cooling area of said cooling station with said cooling area being distanced from the molded part.

3. The injection molding machine according to claim 2, wherein said cooling area comprises a cooling element disposed to be moved toward and away from said heat-dissipating area transversely to a transport direction of said second mold part and to be brought into thermal contact with said heat-dissipating area to directly cool said second mold part.

4. The injection molding machine according to claim 3, wherein said cooling element is an actively cooled element.

5. The injection molding machine according to claim 4, wherein said cooling element is formed with at least one coolant channel through which a cooling fluid can flow.

6. The injection molding machine according to claim 3, which comprises a pressing mechanism configured to press said cooling element planarly against said second mold part.

7. The injection molding machine according to claim 1, wherein said cooling station comprises at least one gas outlet in a cooling area thereof from which a cooling gas can flow directly onto said heat-dissipating area.

8. The injection molding machine according to claim 1, which comprises a heating station disposed as a further station along said transport route.

9. The injection molding machine according to claim 1, wherein said transport route forms a closed loop.

10. The injection molding machine according to claim 1, wherein said transport route is formed by linear conveyors disposed at a substantially 90 degree angle relative to one another and connected at ends thereof by rotary actuators.

11. The injection molding machine according to claim 1, wherein said baseplate comprises a temperature control element.

12. The injection molding machine according to claim 11, wherein said baseplate is formed with air passage openings.

13. The injection molding machine according to claim 11, which comprises at least one sensor configured to detect a baseplate temperature.

14. The injection molding machine according to claim 11, wherein said temperature control element is formed by channels for conducting a heat transfer medium therethrough.

15. The injection molding machine according to claim 14, wherein channels run parallel to a plane of said baseplate, said channels have a neutral axis consistent with a neutral axis of said baseplate, and said channels are formed with bores in end faces of said baseplate, wherein inlets/outlets of said channels are partially connected together by way of connecting elements.

16. The injection molding machine according to claim 14, which comprises a pump configured to pump the heat transfer medium intermittently through said channels.

17. The injection molding machine according to claim 1, wherein said base frame includes a lower frame disposed on three height-adjustable feet.

18. The injection molding machine according to claim 17, wherein said base frame comprises an upper frame connected to said lower frame by way of supports.

19. The injection molding machine according to claim 18, wherein said supporting elements are affixed to said upper frame and said supporting elements are formed with a conical recess in which a hemispherical support engages.

20. An apparatus for the manufacture of injection molded parts, the apparatus comprising:
    a machine table having a base frame with three supporting elements, and a baseplate disposed on said supporting elements;
    a mold part disposed at a machine nozzle and a plurality of moveable mold parts, wherein said mold parts are transportable independently from other said mold parts;
    a plurality of elements disposed at said baseplate of said machine table, as follows:
       an injection molding station for charging melt into a cavity of a mold corresponding to the injection molded part;
       an ejection station remote from said injection station for receiving the movable mold parts and ejecting the molded parts;
       at least one further station wherein the injection molded parts or said mold parts are processed;
       at least one transport route for guiding said mold parts and for transporting said mold parts from one station to another station; and
       independently movable rails configured to engage said mold parts and for moving said mold parts.

* * * * *